(12) United States Patent
Wittmer

(10) Patent No.: US 10,611,472 B2
(45) Date of Patent: Apr. 7, 2020

(54) COAXIAL ROTOR YAW CONTROL

(71) Applicant: Sikorsky Aircraft Corporation, Stratford, CT (US)

(72) Inventor: Kenneth S. Wittmer, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 850 days.

(21) Appl. No.: 14/053,923

(22) Filed: Oct. 15, 2013

(65) Prior Publication Data

US 2015/0102158 A1    Apr. 16, 2015

(51) Int. Cl.
*B64C 27/57* (2006.01)
*B64C 27/10* (2006.01)

(52) U.S. Cl.
CPC .............. *B64C 27/57* (2013.01); *B64C 27/10* (2013.01)

(58) Field of Classification Search
CPC ......... B64C 27/57; B64C 27/72; B64C 27/10; B64C 2027/7216; B64C 2027/7205; G05D 1/0066
See application file for complete search history.

(56) References Cited

U.S. PATENT DOCUMENTS

| 2,835,331 | A |   | 5/1958  | Ryan et al. |             |
|-----------|---|---|---------|-------------|-------------|
| 3,409,249 | A | * | 11/1968 | Bergquist   | B64C 27/10  |
|           |   |   |         |             | 244/17.13   |
| 3,521,971 | A | * | 7/1970  | Cheney, Jr. | B64C 27/10  |
|           |   |   |         |             | 416/1       |
| 3,570,786 | A | * | 3/1971  | Lewis       | B64C 27/54  |
|           |   |   |         |             | 244/17.13   |
| 4,008,979 | A | * | 2/1977  | Cooper      | B64C 27/80  |
|           |   |   |         |             | 244/17.23   |
| 4,027,999 | A | * | 6/1977  | Durno       | B64C 27/80  |
|           |   |   |         |             | 416/114     |
| 4,525,123 | A | * | 6/1985  | Curci       | B64C 27/54  |
|           |   |   |         |             | 416/114     |
| 5,676,334 | A | * | 10/1997 | Cotton      | B64C 27/54  |
|           |   |   |         |             | 244/12.2    |
| 6,431,494 | B1| * | 8/2002  | Kinkead     | B64C 27/20  |
|           |   |   |         |             | 244/17.13   |

(Continued)

FOREIGN PATENT DOCUMENTS

| EP | 2476614 A    | 7/2012 |
| WO | 2015057628 A1| 4/2015 |

OTHER PUBLICATIONS

International Preliminary Report on Patentability for Application No. PCT/US2014/060374, dated Jan. 21, 2015; 6 pages.

(Continued)

*Primary Examiner* — Christopher D Hutchens
(74) *Attorney, Agent, or Firm* — Cantor Colburn LLP

(57) ABSTRACT

A method includes determining, by a computing device comprising a processor, a value for at least one parameter related to an operation of a coaxial rotary wing aircraft; processing, by the computing device, the at least one parameter to determine control power available from one or more flight controls comprising a differential cyclic; and establishing, by the computing device, a value for the differential cyclic to create a net yaw moment for the rotary wing aircraft based on the determination of the available control power.

16 Claims, 4 Drawing Sheets

(56) References Cited

U.S. PATENT DOCUMENTS

| | | | | |
|---|---|---|---|---|
| 6,478,262 B1* | 11/2002 | Kinkead | | B64C 27/20 244/17.13 |
| 6,735,500 B2 | 5/2004 | Nicholas et al. | | |
| 7,083,142 B2* | 8/2006 | Scott | | B64C 27/10 244/17.13 |
| 7,210,651 B2* | 5/2007 | Scott | | B64C 27/10 244/17.13 |
| 7,717,368 B2 | 5/2010 | Yoeli | | |
| 7,967,239 B2* | 6/2011 | Cotton | | B64C 27/10 244/17.19 |
| 8,456,328 B2 | 6/2013 | Karthikeyan et al. | | |
| 9,045,226 B2* | 6/2015 | Piasecki | | G05D 1/102 |
| 2002/0109044 A1* | 8/2002 | Rock | | B64C 27/10 244/17.23 |
| 2005/0211826 A1* | 9/2005 | Pai | | B64C 27/10 244/17.13 |
| 2005/0236518 A1* | 10/2005 | Scott | | B64C 27/10 244/17.23 |
| 2006/0269413 A1* | 11/2006 | Cotton | | B64C 27/10 416/170 R |
| 2006/0273220 A1* | 12/2006 | Scott | | B64C 27/10 244/17.13 |
| 2007/0084962 A1* | 4/2007 | Zientek | | B64C 27/08 244/17.11 |
| 2007/0158494 A1* | 7/2007 | Burrage | | B64C 29/0033 244/7 R |
| 2009/0159740 A1* | 6/2009 | Brody | | B64C 27/10 244/17.21 |
| 2010/0017048 A1* | 1/2010 | Sahasrabudhe | | B64C 27/57 701/3 |
| 2011/0315806 A1* | 12/2011 | Piasecki | | G05D 1/102 244/2 |
| 2012/0153074 A1* | 6/2012 | Nannoni | | B64C 27/57 244/17.13 |
| 2013/0015289 A1* | 1/2013 | Fortenbaugh | | B64C 27/57 244/17.13 |
| 2013/0134255 A1* | 5/2013 | Fortenbaugh | | G01C 23/005 244/17.13 |
| 2013/0181087 A1 | 7/2013 | Long et al. | | |
| 2013/0211634 A1* | 8/2013 | Cherepinsky | | B64C 13/503 701/7 |
| 2014/0252158 A1* | 9/2014 | Schaeffer | | B64D 31/06 244/17.13 |
| 2015/0097075 A1* | 4/2015 | Agnihotri | | B64C 27/10 244/17.13 |
| 2015/0217613 A1* | 8/2015 | Piasecki | | G05D 1/102 701/2 |

OTHER PUBLICATIONS

International Search Report for International Appln. No. PCT/US2014-060374; International Filing Date: Oct. 14, 2014; dated Jan. 21, 2015; 3 pages.

Written Opinion of the International Searching Authority for International Appln. No. PCT/US2014/060374; International Filing Date: Oct. 14, 2014; dated Jan. 21, 2015; 9 pages.

EP Communication; Extended European Search Report; Application No. 14853410.0-1754/3057866 PCT/US2014060374; dated May 10, 2017; pp. 1-8.

Official Action and Search Report; Russian Application No. 2016118572/11(029137); dated Jul. 2, 2018; 16 Pages.

* cited by examiner

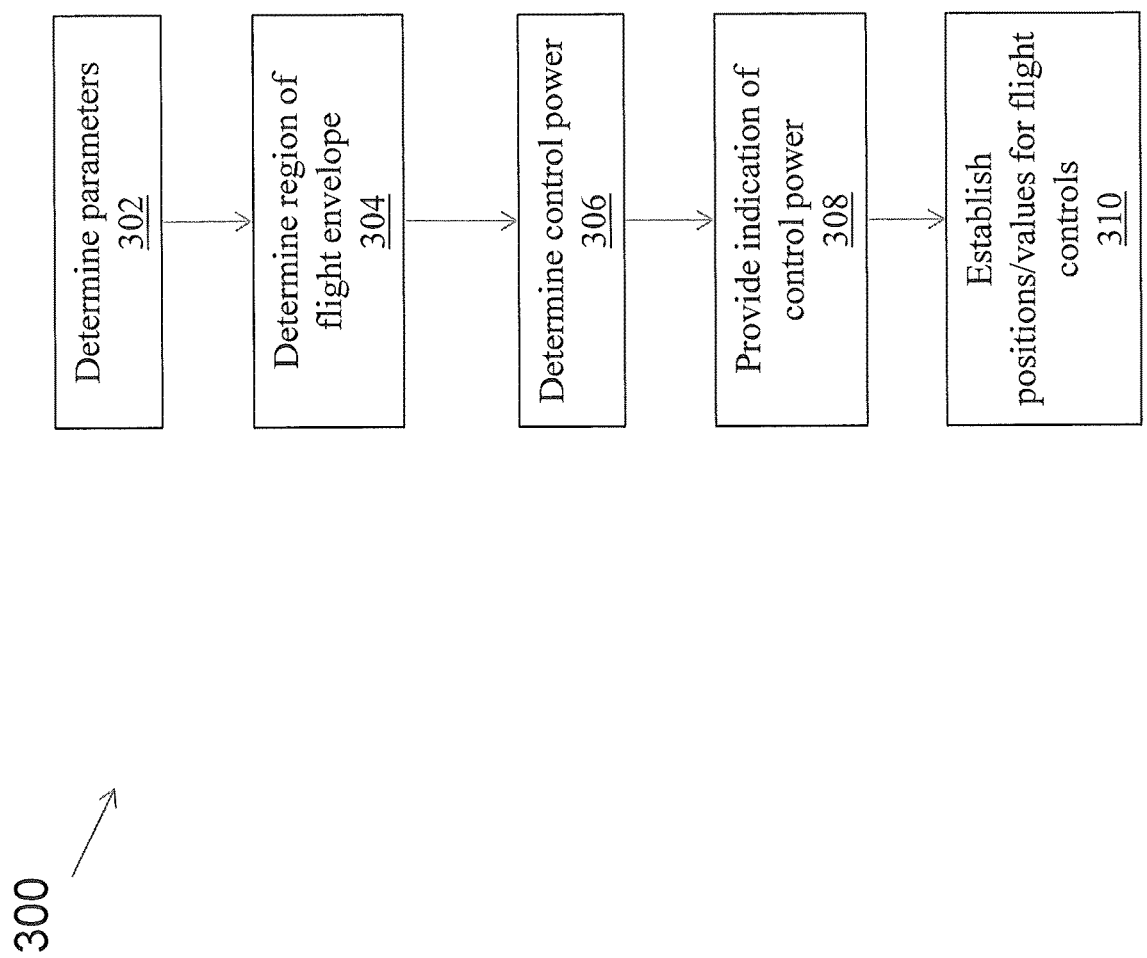

COAXIAL ROTOR YAW CONTROL

BACKGROUND

In an aerospace or rotorcraft environment, coaxial rotors have the ability to provide yaw control by varying a balance of torque between the individual rotors. Torque balancing may be achieved through the application and use of a differential collective. A well-known shortcoming of the coaxial configuration is a reduction, and eventual reversal, of the yaw control authority provided by differential collective when operating in one or more regions of a flight envelope, such as during moderate speed descent conditions. Very large rudders may be used in an effort to compensate for such reduction/reversal.

BRIEF SUMMARY

An exemplary embodiment is directed to a method including determining, by a computing device comprising a processor, a value for at least one parameter related to an operation of a coaxial rotary wing aircraft; processing, by the computing device, the at least one parameter to determine control power available from one or more flight controls comprising a differential cyclic; and establishing, by the computing device, a value for the differential cyclic to create a net yaw moment for the rotary wing aircraft based on the determination of the available control power.

Another exemplary embodiment is directed to an apparatus including at least one processor; and memory having instructions stored thereon that, when executed by the at least one processor, cause the apparatus to: determine a value for at least one parameter related to an operation of a coaxial rotary wing aircraft, process the at least one parameter to determine control power available from one or more flight controls comprising a differential cyclic, and establish a value for the differential cyclic to create a net yaw moment for the rotary wing aircraft based on the determination of the available control power.

Another exemplary embodiment is directed to a rotary wing aircraft including: a first rotor aligned with a second rotor as part of a coaxial configuration; sensors coupled to the first and second rotors; and a computing device coupled to the sensors and configured to: process data provided by the sensors to determine control power available from one or more flight controls comprising a differential cyclic, and establish a value for the differential cyclic to create a net yaw moment for the rotary wing aircraft based on the determination of the available control power.

Additional embodiments are described below.

BRIEF DESCRIPTION OF THE DRAWINGS

The present disclosure is illustrated by way of example and not limited in the accompanying figures in which like reference numerals indicate similar elements.

FIG. 3 illustrates a flow chart of an exemplary method.

DETAILED DESCRIPTION

Figure 1A:
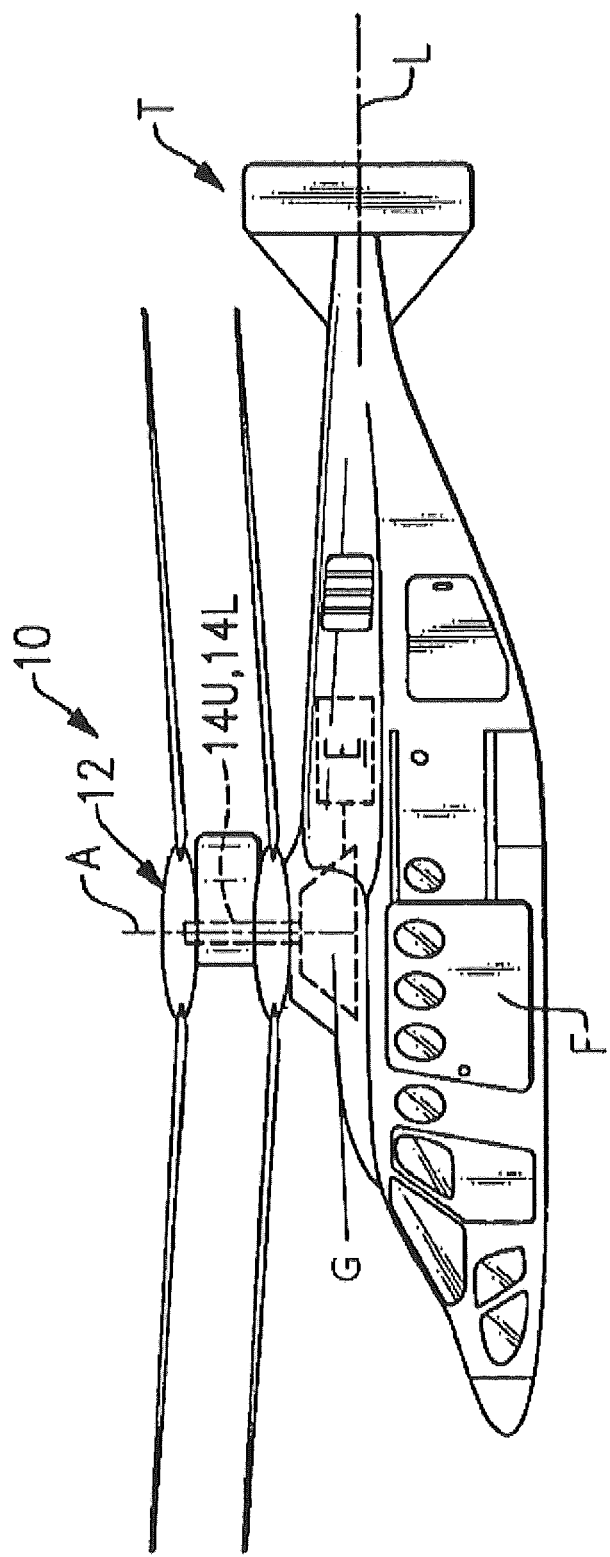
FIG. 1A is a general perspective side view of an exemplary rotary wing aircraft

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for creating a net yaw moment for an aircraft. In some embodiments, a differential cyclic may be used to create the net yaw moment. A phasing of the differential cyclic may depend on the direction of the wind relative to an orientation or direction of travel of the aircraft. Yaw control power may be relatively steady or constant in a range from, e.g., twenty knots to eighty knots, including during descent where control using a differential collective may be lost. In some embodiments, an empirical model may be used to estimate the yaw control power available from the differential collective or other means of yaw control. This information can be used to cue the pilot and/or reconfigure flight controls.

FIG. 1A illustrates an exemplary vertical takeoff and landing (VTOL) rotary wing aircraft 10 having a dual, counter-rotating main rotor system 12, which rotates about a rotating main rotor shaft 14U, and a counter-rotating main rotor shaft 14L, both about an axis of rotation A. The aircraft 10 includes an airframe F which supports the dual, counter-rotating, coaxial main rotor system 12 as well as an optional translational thrust system T which provides translational thrust during high speed forward flight, generally parallel to an aircraft longitudinal axis L. Although a particular counter-rotating, coaxial rotor system aircraft configuration is illustrated in the disclosed embodiment, other rotor systems and other aircraft types such as tilt-wing and tilt-rotor aircrafts will also benefit from the present disclosure.

A main gearbox G located above the aircraft cabin drives the rotor system 12. The translational thrust system T may be driven by the same main gearbox G which drives the rotor system 12. The main gearbox G is driven by one or more engines E. As shown, the main gearbox G may be interposed between the engines E, the rotor system 12, and the translational thrust system T.

Figure 1B:
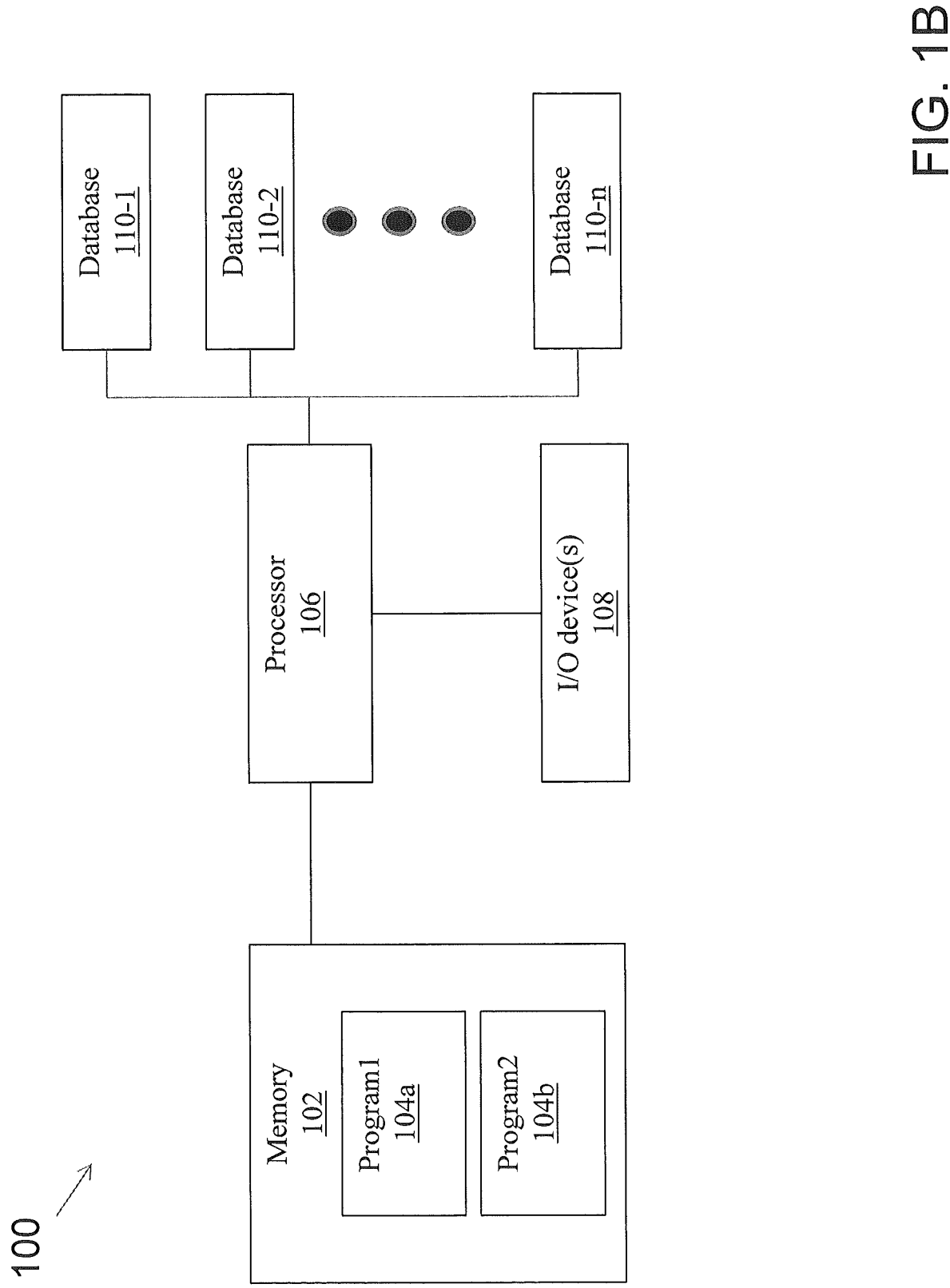
FIG. 1B is a schematic block diagram illustrating an exemplary computing system.

Referring to FIG. 1B, an exemplary computing system 100 is shown. Computing system 100 may be part of a flight control system of the rotary wing aircraft 10. The system 100 is shown as including a memory 102. The memory 102 may store executable instructions. The executable instructions may be stored or organized in any manner and at any level of abstraction, such as in connection with one or more applications, processes, routines, procedures, methods, etc. As an example, at least a portion of the instructions are shown in FIG. 1B as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a control stick, a joystick, a printer, a telephone or mobile device (e.g., a smartphone), etc. The I/O device(s) 108 may be configured to provide an interface to allow a user to interact with the system 100.

As shown, the processor 106 may be coupled to a number 'n' of databases, 110-1, 110-2, . . . 110-n. The databases 110 may be used to store data. In some embodiments, the data may include one or more parameters associated with the operation of an aircraft (e.g., a coaxial rotorcraft). For example, the data may include one or more parameters related to airspeed, power supplied to one or more rotors, rotor thrust, descent or ascent rate, and angle of attack. The processor 106 may be operative on the data to determine or predict control power that may be available using one or more flight controls.

The system 100 is illustrative. In some embodiments, one or more of the entities may be optional. In some embodiments, additional entities not shown may be included. In some embodiments, the entities may be arranged or organized in a manner different from what is shown in FIG. 1B. For example, in some embodiments, the memory 102 may be coupled to or combined with one or more of the databases 110.

Figure 2:
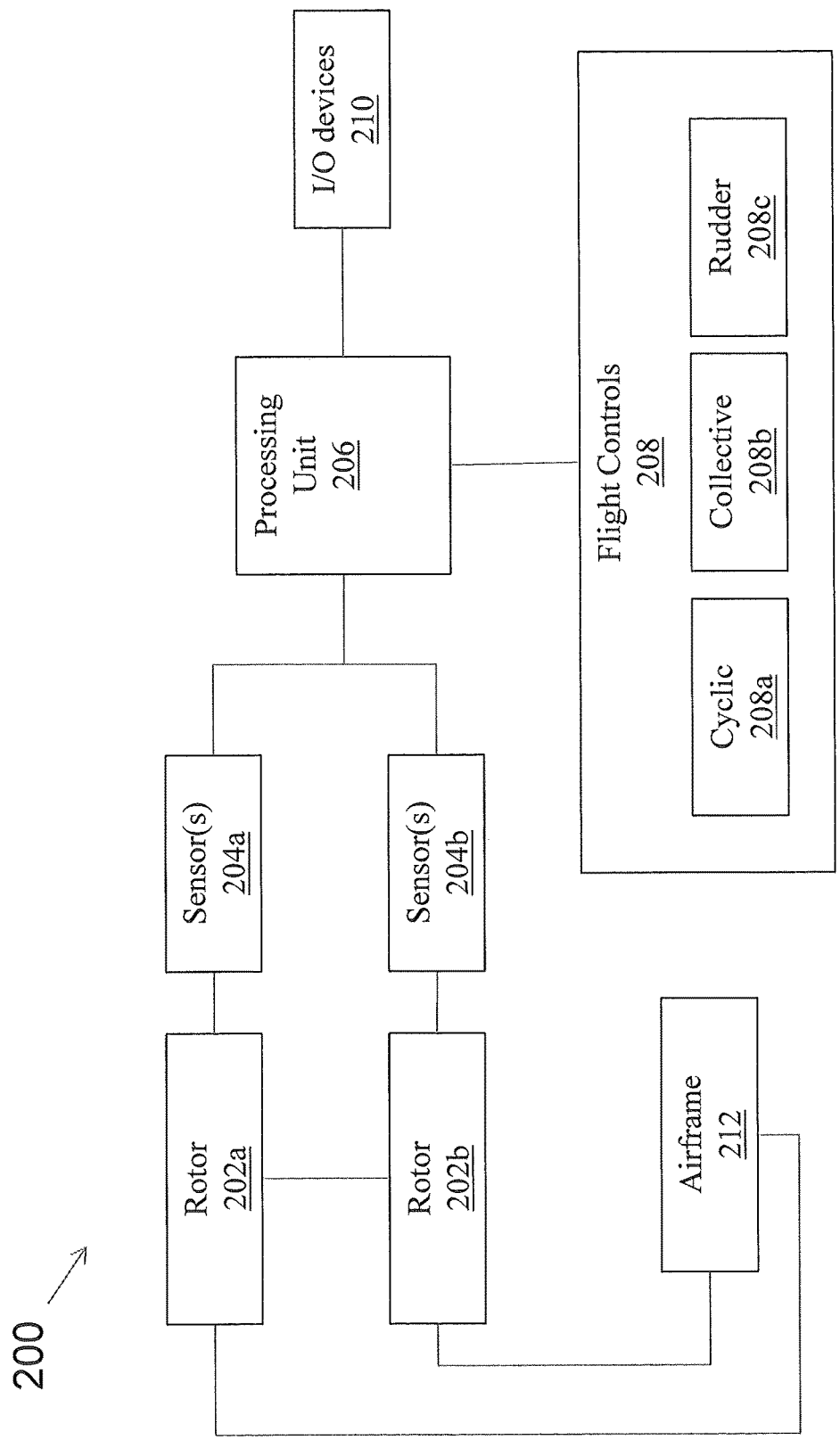
FIG. 2 is a block diagram of an exemplary system environment.

Referring to FIG. 2, a block diagram of a system 200 is shown. The system 200 may be used to determine or predict control power that may be available. In some embodiments, the system 200 may be used as a basis for providing yaw control to rotary wing aircraft 10. The system 200 may be included as part of the rotary wing aircraft 10.

The system 200 is shown as including a rotor 202a and a rotor 202b. The rotors 202a and 202b may be coupled to one another in a coaxial manner or fashion.

The rotors 202a and 202b may be coupled to one or more sensors. For example, as shown in FIG. 2, the rotor 202a may be coupled to one or more sensors 204a. The rotor 202b may be coupled to one or more sensors 204b. In some embodiments, at least a portion of the sensors 204a may be common to a corresponding portion of the sensors 204b. The sensors 204a and/or 204b may be configured to measure one or more parameters, such as those described herein.

The sensor(s) 204a and 204b may be coupled to a processing unit 206. The processing unit 206 may correspond to the processor 106. The processing unit 206 may correspond to a flight control computer.

The processing unit 206 may be operative on data provided by the sensor(s) 204a and 204b. The processing unit 206 may process the data provided by the sensor(s) 204a and 204b to determine or predict control power that may be available using one or more flight controls 208. In some embodiments, the determination/prediction of the control power may be provided by the processing unit 206 to one or more I/O devices 210 (where the I/O devices 210 may correspond to the I/O devices 108). In some embodiments, the determination/prediction of the control power may be based on the actual values or positions for the flight controls 208 and/or may be based on a range of available values/positions for the flight controls 208.

The flight controls 208 may include a cyclic control 208a, a collective control 208b, and a rudder control 208c. While each of the controls 208a-208c is shown in FIG. 2 as a single entity, multiple instances of one or more of the controls 208a-208c may be used in some embodiments. For example, two instances of the cyclic 208a and the collective 208b may be available, such that the first instance of the cyclic 208a and the collective 208b may be applied to the rotor 202a, and a second instance of the cyclic 208a and the collective 208b may be applied to the rotor 202b. Furthermore, the controls 208a-208c may be applied in terms of differential quantities. For example, a differential cyclic may correspond to the difference between the rotor 202a and the rotor 202b in regards to the cyclic 208a.

In some embodiments, based on the determination/prediction of the control power generated by the processing unit 206, a value or position for one or more of the flight controls 208 may be provided. For example, the value or position for the flight controls 208 may be automatically adjusted. Such automatic adjustment may be used in, e.g., fly-by-wire configurations. Alternatively, output provided by the I/O devices 210 may direct a pilot or operator to set the state for one or more of the flight controls 208. The output provided by the I/O devices 210 may advise the pilot/operator of an acceptable range for setting one or more of the flight controls 208 based on, e.g., the region of a flight envelope that the aircraft is operating in.

Based at least in part on the state of the flight controls 208, a (differential) moment may be generated between the rotors 202a and 202b. The moment may be coupled to an airframe 212 of the aircraft. The moment may correspond to an imbalance in torque that may be harnessed or used to provide yaw control for the aircraft.

Turning now to FIG. 3, a flow chart of an exemplary method 300 is shown. The method 300 may be executed by one or more systems, components, or devices, such as those described herein (e.g., the system 100 and/or the system 200). The method 300 may be used to provide yaw control for rotary wing aircraft, such as a coaxial helicopter. The method 300 may be used to generate an indication or determination of control power and may provide output regarding positions for one or more flight controls.

In block 302, one or more parameters (e.g., airspeed, power supplied to one or more rotors, rotor thrust, descent or ascent rate, and angle of attack) may be determined, sensed, or measured.

In block 304, the parameters of block 302 may be processed to determine a region of a flight envelope that an aircraft is operating in. For example, the determination of block 304 may indicate that the aircraft is descending and traveling at a rate of approximately thirty to forty knots, wherein yaw control provided by differential collective between coaxial rotors and/or rudders may be limited. Regions of operation within a flight envelope may be established based on simulation results or via the use of flight test data.

In block 306, a determination may be made regarding control power that may be available using one or more flight controls (e.g., a differential collective and/or rudders). The determination of block 306 may be based on the parameters of block 302 and/or the region of the flight envelope determined in block 304.

In block 308, an indication of the control power of block 306 may be provided. For example, one or more audio or displayed outputs may serve to indicate to a pilot the control power that is available. The pilot may provide values or positions for the flight controls on the basis of the indicated control power.

In block 310, one or more values or positions for flight controls may be established. The values/positions may be set automatically. Alternatively, the values/positions may be set manually (e.g., via pilot actuated controls). As part of block 310, an optimal strategy utilizing the available controls may be applied to create a net yaw moment, which may be used as a basis for providing yaw control for the aircraft. This control strategy may include use of differential cyclic to create a net yaw moment. The optimization may even automatically reverse the direction of application for controls, such as differential collective and rudders, in flight regimes where their yaw moment contribution reverses.

The method 300 is illustrative. In some embodiments, one or more of the blocks or operations (or a portion thereof) may be optional. In some embodiments, additional operations not shown may be included. In some embodiments, the operations may execute in an order or sequence different from what is shown in FIG. 3.

Embodiments of the disclosure may be used to reduce the size of rudders relative to aircraft in current use. A differential cyclic may be used to provide yaw control.

Embodiments of the disclosure may be used to provide for yaw control without adding considerable complexity to a design or platform. Aspects of the disclosure may be used to enhance situational awareness and/or increase stability margins associated with flight controls.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method comprising:
    determining, by a computing device comprising a processor, a value for at least one operational parameter of a coaxial rotary wing aircraft, the at least one operational parameter comprising at least one of airspeed, power supplied to rotors, rotor thrust, descent rate, ascent rate, and angle of attack, the coaxial rotary wing aircraft including a first rotor assembly having a plurality of first blades configured to rotate about an axis of rotation and a second rotor assembly including a plurality of second blades also configured to rotate about the axis of rotation;
    determining, by the computing device, a region of a flight envelope the rotary wing aircraft is operating in, wherein the determination of the region of the flight envelope indicates that yaw control provided by a differential collective of the coaxial rotary wing aircraft is limited;
    processing, by the computing device, the at least one operational parameter and the determined region of the flight envelope to determine control power available from one or more flight controls comprising a differential cyclic, the differential cyclic being operably coupled to both the first rotor and the second rotor, wherein determination of the control power available is based on at least one of actual positions of flight controls and ranges of available positions for the flight controls, the ranges of available positions being based on the region of the flight envelope; and
    establishing, by the computing device, a value for the differential cyclic to create a net yaw moment for the rotary wing aircraft based on the determination of the available control power, wherein the value for the differential cyclic is based on the region of the flight envelope; and
    adjusting the differential cyclic associated with at least one of the first rotor assembly and the second rotor assembly using the computing device to generate the net yaw moment.

2. The method of claim 1, wherein the value for the at least one operational parameter is obtained from a sensor.

3. The method of claim 1, wherein the region of the flight envelope is determined based on simulation.

4. The method of claim 1, wherein the region of the flight envelope is determined based on flight test data.

5. The method of claim 1, wherein generating the net yaw moment includes setting the value for the differential cyclic.

6. The method of claim 5, wherein the value is set by the computing device.

7. The method of claim 5, wherein the value is set via a pilot actuated control.

8. The method of claim 1, further comprising:
    establishing, by the computing device, a value for at least one of a rudder and a differential collective based on the determination of the available control power.

9. An apparatus comprising:
    at least one processor; and
    memory having instructions stored thereon that, when executed by the at least one processor, cause the apparatus to:
        determine a value for operational parameter of a coaxial rotary wing aircraft, the operational parameter comprising at least one of airspeed, power supplied to rotors, rotor thrust, descent rate, ascent rate, and angle of attack, the coaxial rotary wing aircraft including a first rotor assembly having a plurality of first blades configured to rotate about an axis of rotation and a second rotor assembly including a plurality of second blades also configured to rotate about the axis of rotation,
        determine a region of a flight envelope that the coaxial rotary wing aircraft is operating in, wherein the determination of the region of the flight envelope indicates that yaw control provided by a differential collective of the coaxial rotary wing aircraft is limited;
        process the at least one operational parameter and the determined region of the flight envelope to determine control power available from one or more flight controls comprising a differential cyclic, the differential cyclic being operably coupled to both the first rotor and the second rotor, wherein determination of the control power available is based on at least one of actual positions of flight controls and ranges of available positions for the flight controls, the ranges of available positions being based on the region of the flight envelope; and
        establish a value for the differential cyclic to create a net yaw moment for the rotary wing aircraft based on the determination of the available control power, wherein the value for the differential cyclic is based on the region of the flight envelope; and adjusting the differential cyclic associated with at least one of the first rotor assembly and the second rotor assembly using the computing device to generate the net yaw moment.

10. The apparatus of claim 1, wherein the at least one operational parameter comprises at least two operational parameters selected from: airspeed, power supplied to rotors, rotor thrust, descent rate, ascent rate, and angle of attack.

11. The apparatus of claim 9, wherein the region of the flight envelope is determined based on at least one of simulation and flight test data.

12. The apparatus of claim 9, wherein the instructions, when executed by the at least one processor, cause the apparatus to:

set the value for the differential cyclic.

13. The apparatus of claim 9, wherein the instructions, when executed by the at least one processor, cause the apparatus to:

establish a value for a rudder and a differential collective based on the determination of the available control power.

14. A rotary wing aircraft comprising:

a first rotor aligned with a second rotor as part of a coaxial configuration, the first rotor including a plurality of first blades configured to rotate about an axis of rotation and the second rotor including a plurality of second blades also configured to rotate about the axis of rotation;

sensors coupled to the first and second rotors; and a computing device coupled to the sensors and configured to:

determine a region of a flight envelope that the rotary wing aircraft is operating in, wherein the determination of the region of the flight envelope indicates that yaw control provided by a differential collective of the rotary wing aircraft is limited;

process data provided by the sensors and the determined region of the flight envelope to determine control power available from one or more flight controls comprising a differential cyclic, the differential cyclic being operably coupled to both the first rotor and the second rotor, wherein determination of the control power available is based on at least one of actual positions of flight controls and ranges of available positions for the flight controls, the ranges of available positions being based on the region of the flight envelope; and establish a value for the differential cyclic to create a net yaw moment for the rotary wing aircraft based on the determination of the available control power, wherein the valve for the differential cyclic is based on the region of the flight envelope; and adjust the differential cyclic associated with at least one of the first rotor and the second rotor using the computing device to generate the net yaw moment.

15. The rotary wing aircraft of claim 14, further comprising:

a display device coupled to the computing device and configured to display at least one of: the available control power, the value for the differential cyclic, and a region of a flight envelope the rotary wing aircraft is operating in.

16. The rotary wing aircraft of claim 14, wherein the computing device is configured to set the value for the differential cyclic.

* * * * *